United States Patent
Wiener

[15] 3,645,754

[45] Feb. 29, 1972

[54] MEAT FLAVOR AND ITS PREPARATION

[72] Inventor: Charles Wiener, Middletown, N.Y.

[73] Assignee: Polak's Frutal Works, Inc., Middletown, N.Y.

[22] Filed: Aug. 1, 1968

[21] Appl. No.: 749,276

[30] Foreign Application Priority Data

Aug. 11, 1967 Great Britain......................37,099/67

[52] U.S. Cl. .........................................................99/140 R
[51] Int. Cl. .................................................................A23l 1/26
[58] Field of Search.....................................................99/140

[56] References Cited

UNITED STATES PATENTS 2,934,437  4/1960  Morton...................................99/140
3,394,015  7/1968  Giacino..................................99/140

FOREIGN PATENTS OR APPLICATIONS 276,602  10/1951  Switzerland
276,603  10/1951  Switzerland
276,604  10/1951  Switzerland

OTHER PUBLICATIONS

W. M. Malisoff et al., " A Study of Mercaptan Chemistry," Chemical Reviews, Vol. VII, No. 4, title page, 493, 497, 534 (1930).

E. P. Mecchi et al., Journal of Food Science, 29, 393– 399 (1964).

*Primary Examiner*—Morris O. Wolk
*Assistant Examiner*—Sidney Marantz
*Attorney*—Morgan, Finnegan, Durham & Pine

[57] ABSTRACT

A process for the preparation of a meat flavor and to food products containing this flavoring substance. The present invention provides a process for the preparation of a meatlike flavoring substance which comprises reacting certain sulfide or hydrosulfide sulfur compounds with certain carbohydrates preferably in the presence of a solvent.

3 Claims, No Drawings

MEAT FLAVOR AND ITS PREPARATION

It is well known that amino acids, in general, react with sugars which frequently result in foodlike aromas (Hartz, W.J. and P.S. Shallenburger, Food Research 25, 491 (1960). An example is the reaction of cystein (I.D. Morton, P. Akroyd and C.G. May, U.S. Pat. No. 2,934,437, Apr. 26, 1960), with sugars resulting in meatlike aromas. However, the present invention is new and unique in that cystein or other amino acids are not required and in this type of reaction can be replaced by certain inorganic sulfur compounds to form meatlike products.

The process of this invention comprises reacting a sulfur compound selected from the group consisting of ammonium sulfide, ammonium hydrosulfide, alkali metal sulfides, alkali metal hydrosulfides, alkaline earth metal sulfides, alkaline earth metal hydrosulfides and amino hydrosulfides with a carbohydrate selected from the group consisting of disaccharides, hexoses, pentoses, 1,3-dihydroxy-2-propanone and glyceraldehyde, with or without solvent at elevated temperature with ensuing acidification of the reaction mixture.

Examples of alkali metal sulfides and hydrosulfides that may be used are sodium sulfide, potassium sulfide, sodium hydrosulfide and potassium hydrosulfide. Examples of alkaline earth metal sulfides and hydrosulfides are calcium sulfide and calcium hydrosulfide. An example of an amine hydrosulfide is 2-amino ethanol hydrosulfide.

Examples of disaccharides that may be used are maltose, sucrose and lactose. Typical hexoses that may be reacted are glucose, fructose and invert sugar, while examples of pentoses are xylose, arabinose and ribose.

The solvents for the reaction are preferably water, glycerol, propylene glycol, ethanol or similar hydroxylated solvents or mixtures thereof.

Factors which may affect the quality of the flavor produced include the nature and relative amounts of the carbohydrate(s) and sulfur reagent used, the amount of solvent used and the time and temperature of heating. To obtain a flavor with good meat qualities the carbohydrate used should be present in the range of 0.1–4 moles per 1.0 mole of the sulfur reagent present.

The reaction is generally carried out in the presence of a hydroxylated solvent preferably water, glycerol, or propylene glycol. The amount of any of these alone or in combination which should be present is in an amount between 0.1 and 10 times the total weight of the carbohydrate and the sulfur reagent. Amounts of solvent of up to 1,000 times the total weight of the carbohydrate plus the sulfur reagent can, however, also be used.

The reaction may be carried out by heating from between 35° C. to 100° C., when the major solvent is water and from 1 minute to 4 hours in duration; lower temperatures require longer heating times. When the major solvent is glycerol or propylene glycol the reaction may be carried out between 30° C. and 250° C. and with respect to time from 1 minute to 20 hours.

After the reaction period the reaction mass is acidified to pH 1–7 using a suitable pH adjusting agent, e.g., hydrochloric acid, sulfuric acid, etc., and a meatlike flavor is obtained.

Meat flavoring substances according to the invention may by incorporated in a wide variety of meat or meatlike products or used to flavor blend materials such as farina, soya protein, vegetable oil, gelatin, etc., where a meaty flavor is desirable. The flavoring agent is incorporated in an appropriate amount (e.g., 0.5–25 p.p.m.). Of course, the higher the amount of flavoring agent, the stronger the flavoring effect that is achieved.

In order to obtain a uniform distribution of the flavoring agent in the foodstuff, it is preferred that the flavoring agent be applied in a dilute form to the foodstuff. Any suitable diluent which serves as a solvent for the flavoring agent may be used such, for example, as propylene glycol, vegetable oil, etc. The solution of flavoring agent may be applied to the foodstuff in any suitable manner such, for example, by spraying, dipping or any other suitable coating procedure.

The following examples are given to illustrate the invention:

EXAMPLE 1

The following ingredients were mixed together and boiled for 10 minutes:
- 1.8 g. glucose
- 1.6 g. sodium sulfhydrate
- 20.0 ml. water After heating the mixture was cooled, acidified to pH 3 with concentrated hydrochloric acid and allowed to stand, uncovered for 1 hour at room temperature to dispel excess hydrogen sulfide. The resultant material had a meaty aroma and taste.

EXAMPLE 2

The following ingredients were mixed together and heated at 150°–170° C. for 10 minutes:
- 0.5 g. fructose
- 0.5 g. sodium sulfide
- 5.0 ml. glycerol After heating, the mixture was poured into 25 ml. of water and acidified to pH 3 with sulfuric acid to dispel excess hydrogen sulfide. The resultant material had a meaty aroma and taste.

EXAMPLE 3

The following ingredients were mixed together and saturated with hydrogen sulfide:
- 3.6 g. 2-amino ethanol
- 40.0 ml. water To this solution was added the following:
- 3.6 g. glucose The solution was boiled for 5 minutes, then acidified to pH 3 with hydrochloric acid and allowed to stand, uncovered for 1 hour to dispel excess hydrogen sulfide giving a product with a meatlike aroma.

EXAMPLE 4

The following ingredients were mixed together and boiled for 10 minutes:
- 1.5 g. D-Xylose
- 1.5 g. sodium hydrosulfide
- 10 ml. water After heating, the mixture was cooled, acidified to pH 3 with 10 percent sulfuric acid and allowed to stand, uncovered, for 1 hour at room temperature to dispel the excess hydrogen sulfide. The resultant material had a meaty veal aroma.

EXAMPLE 5

The following ingredients were mixed together and boiled for 5 minutes:
- 0.9 g. sucrose
- 0.8 g. sodium hydrosulfide
- 10 ml. water After heating the mixture was cooled, acidified to pH 3 with 10 percent hydrochloric acid and allowed to stand, uncovered, for 1 hour at room temperature to dispel the excess hydrogen sulfide, the resultant material had a meaty aroma.

EXAMPLE 6

The following materials were mixed together and hydrogen sulfide bubbled into the solution at a fast rate, for 10 minutes:
- 1.8 g. glucose
- 4 ml. ammonium hydroxide (28 percent)
- 20 ml. water The solution was then boiled for 15 minutes and cooled and acidified. This gave a nice roast meat aroma.

EXAMPLE 7

The following ingredients were mixed together and boiled for 5 minutes:
- 0.5 g. 1,3-dihydroxy-2-propanone
- 0.5 g. sodium hydrosulfide
- 10 ml. water The solution was then cooled, acidified to pH 3 with hydrochloric acid and allowed to stand uncovered for 1 hour at room temperature to dispel excess hydrogen sulfides. The resultant material had a meaty aroma.

EXAMPLE 8

The following ingredients were mixed together and boiled for 5 minutes:
0.1 g. D-glyceraldehyde
0.1 g. sodium hydrosulfide
5 ml. water The solution was then cooled, acidified to pH 3 with hydrochloric acid and allowed to stand uncovered for 1 hour at room temperature to dispel excess hydrogen sulfide. The resultant material had a meaty aroma.

What is claimed is:

1. A process for the preparation of a meat flavor comprising reacting a sulfur compound selected from the group consisting of ammonium sulfide, ammonium hydrosulfide, alkali metal sulfides, alkali metal hydrosulfides, alkaline earth metal sulfides, alkaline earth metal hydrosulfides and nonamino acid amine hydrosulfides with a carbohydrate selected from the group consisting of disaccharides, hexoses, pentoses, 1,3-dihydroxy-2-propanone and glyceraldehyde, with or without solvent at elevated temperature with ensuing acidification of the reaction mixture.

2. A meat flavor prepared in accordance with claim 1.

3. The method of imparting a meat flavor to a foodstuff comprising treating the foodstuff with the product of claim 2.

* * * * *